United States Patent
Carver

[19]

[11] Patent Number: 6,002,603
[45] Date of Patent: Dec. 14, 1999

[54] BALANCED BOOST/BUCK DC TO DC CONVERTER

[75] Inventor: John F. Carver, Hobe Sound, Fla.

[73] Assignee: Elliott Energy Systems, Inc., Stuart, Fla.

[21] Appl. No.: 09/257,443

[22] Filed: Feb. 25, 1999

[51] Int. Cl.⁶ .......................... H02M 7/44; H02M 7/5387
[52] U.S. Cl. ................. 363/98; 363/17; 363/132
[58] Field of Search .................. 363/16, 17, 55, 363/56, 95, 97, 98, 131, 132

[56] References Cited

U.S. PATENT DOCUMENTS

| | | | |
|---|---|---|---|
| 3,569,809 | 3/1971 | Comer | 318/338 |
| 3,925,772 | 12/1975 | Miller et al. | 340/253 C |
| 4,122,516 | 10/1978 | Tokunaga | 363/79 |
| 4,145,618 | 3/1979 | Restori et al. | 307/64 |
| 4,161,773 | 7/1979 | Szpakowski | 363/49 |
| 4,165,795 | 8/1979 | Lynch et al. | 180/65 A |
| 4,254,344 | 3/1981 | Fancy et al. | 307/86 |
| 4,395,675 | 7/1983 | Toumani | 323/271 |
| 4,409,525 | 10/1983 | Hartwig | 318/139 |
| 4,422,032 | 12/1983 | Kakumoto et al. | 320/39 |
| 4,488,057 | 12/1984 | Clarke | 307/66 |
| 4,489,369 | 12/1984 | Ginsberg | 363/21 |
| 4,698,743 | 10/1987 | Onodera et al. | 363/136 |
| 4,736,151 | 4/1988 | Dishner | 323/224 |
| 4,761,726 | 8/1988 | Brown | 363/51 |
| 4,786,852 | 11/1988 | Cook | 322/10 |
| 4,827,151 | 5/1989 | Okado | 307/66 |
| 4,947,100 | 8/1990 | Dhyanchand et al. | 322/10 |
| 4,947,311 | 8/1990 | Peterson | 363/124 |
| 4,968,926 | 11/1990 | Dhyanchand | 322/10 |
| 4,985,819 | 1/1991 | Mori et al. | 363/37 |
| 4,992,721 | 2/1991 | Latos | 322/10 |
| 4,998,054 | 3/1991 | Bose et al. | 318/802 |
| 5,012,177 | 4/1991 | Dhyanchand et al. | 322/10 |
| 5,031,086 | 7/1991 | Dhyanchand et al. | 363/37 |
| 5,059,887 | 10/1991 | Iida et al. | 323/222 |
| 5,086,383 | 2/1992 | Oda | 363/44 |
| 5,119,283 | 6/1992 | Steigerwald et al. | 363/37 |
| 5,182,508 | 1/1993 | Schauder | 318/801 |
| 5,257,174 | 10/1993 | Ogiwara et al. | 363/36 |
| 5,307,004 | 4/1994 | Carsten | 323/222 |
| 5,341,075 | 8/1994 | Cocconi | 318/139 |
| 5,359,280 | 10/1994 | Canter et al. | 323/282 |
| 5,371,667 | 12/1994 | Nakao et al. | 363/124 |
| 5,387,859 | 2/1995 | Murugan et al. | 322/10 |
| 5,389,825 | 2/1995 | Ishikawa et al. | 307/10.1 |
| 5,400,237 | 3/1995 | Flanagan et al. | 363/41 |
| 5,412,268 | 5/1995 | Arnaud et al. | 310/67 R |
| 5,412,308 | 5/1995 | Brown | 323/267 |
| 5,479,333 | 12/1995 | McCambridge et al. | 363/49 |

(List continued on next page.)

*Primary Examiner*—Matthew Nguyen
*Attorney, Agent, or Firm*—Webb Ziesenheim Logsdon Orkin & Hanson, P.C.

[57] ABSTRACT

A DC to DC converter includes a first transistor having a first power terminal connected to one side of a DC power supply and a second power terminal connected to one end of an inductor. A second transistor has a first power terminal connected to the other end of the inductor and a second power terminal connected to the other side of the DC power supply. A pair of capacitors is connected in series and defined therebetween a node which is connected to a ground potential. A third transistor has a first power terminal connected to the one end of the inductor and a second power terminal connected to one end of the pair of capacitors. A fourth transistor has a first power terminal connected to the other end of the pair of capacitors and a second power terminal connected to the other end of the inductor. Each transistor includes a diode connected between the first power terminal and the second power terminal thereof. Each diode is oriented to conduct current in a direction opposite its corresponding transistor. A controller is connected to a control terminal of each transistor for controlling the switching thereof. The DC to DC converter can be operated to increase or decrease a DC voltage between the DC power supply and the pair of capacitors connected in series. Connecting the ground potential to the node between the pair of capacitors avoids generating large potential differences between the DC power supply and the pair of capacitors.

26 Claims, 5 Drawing Sheets

U.S. PATENT DOCUMENTS

| | | | |
|---|---|---|---|
| 5,497,289 | 3/1996 | Sugishima et al. | 361/709 |
| 5,532,577 | 7/1996 | Doluca | 323/282 |
| 5,543,704 | 8/1996 | Thorén | 323/222 |
| 5,552,681 | 9/1996 | Suzuki et al. | 318/139 |
| 5,563,775 | 10/1996 | Kammiller | 363/98 |
| 5,583,406 | 12/1996 | Mutoh et al. | 318/376 |
| 5,610,805 | 3/1997 | Gupta | 363/37 |
| 5,631,814 | 5/1997 | Zak | 363/37 |
| 5,657,212 | 8/1997 | Poon et al. | 363/17 |
| 5,680,301 | 10/1997 | Oughton, Jr. et al. | 363/132 |
| 5,694,307 | 12/1997 | Murugan | 363/37 |
| 5,835,371 | 11/1998 | Kume et al. | 363/132 |
| 5,872,703 | 2/1999 | Williiams et al. | 363/98 |

BALANCED BOOST/BUCK DC TO DC CONVERTER

BACKGROUND OF THE INVENTION

1. Field of the Invention

The present invention relates to power converters, and more particularly, to DC to DC converters.

2. Background Art

Turbine generator systems often include a gas powered turbine to provide motive force to an alternator which provides single phase or polyphase AC power to a load. When starting the turbine from a rest position, the alternator can be driven as a motor to provide motive force to the turbine until it is running at a self-sustaining, operational speed. When starting the turbine utilizing the alternator as a motor, it is often necessary to convert DC voltage generated by one or more batteries into an AC voltage of sufficient potential for use by the alternator when driven as a motor. Typically, a power inverter system electrically connected between the batteries and the alternator is utilized to increase the potential of the DC voltage and to convert the increased potential DC voltage into an AC voltage for use by the alternator. More specifically, the power inverter system includes a DC to DC converter to increase the DC voltage of the batteries and a DC to AC power inverter to convert the increased DC voltage into an AC voltage usable by the alternator.

A problem with prior art power inverter systems is that the ground potential of the batteries can float such that when the turbine generator is operating, a large potential difference can exist between the batteries and electrical components of the power inverter system. This large potential difference requires that instrumentation connected between the chassis and the electrical components of the power inverter system be isolated from ground potentials that can achieve 1000 volts DC or more.

It is therefore an object of the present invention to provide a power inverter system which avoids large potential differences between the chassis of the turbine generator and the electrical component of the power inverter system. It is an object of the present invention to provide a power inverter system which can charge the batteries after the turbine generator is running at operating speed. It is an object of the present invention to provide a power inverter system having a DC to DC converter which boosts and controls both the positive and negative DC bus voltages and which provides a common electrical voltage reference which can be adjusted to a potential between, preferably intermediate, the positive and negative voltages of the DC bus. It is an object of the present invention to provide a power inverter system that can generate a low impedance electrical voltage reference (hereinafter "neutral") that can be utilized as a current return path for the electrical components of the power inverter system. It is an object of the present invention to utilize this low impedance electrical neutral as a ground reference for a three-phase output voltage generated by the power inverter system. It is an object of the present invention to provide this neutral without additional electronic components and associated control circuitry. Still other objects of the present invention will become apparent to those of ordinary skill in the art upon reading and understanding the following detailed description.

SUMMARY OF THE INVENTION

Accordingly, I have invented a DC to DC converter having an inductor and a first transistor having a first power terminal connectable to one side of a DC power supply and a second power terminal connected to one end of the inductor. A second transistor has a first terminal connected to the other end of the inductor and a second power terminal connected to another side of the DC power supply. A pair of capacitors is connected in series and defines a node therebetween which is connected to a ground potential. A third transistor has a first power terminal connected to one end of the inductor and a second power terminal connected to one end of the pair of capacitors. A fourth transistor has a first power terminal connected to the other end of the pair of capacitors and a second power terminal connected to the other end of the inductor. A controller is connected to a control terminal of each transistor for controlling the switching thereof.

The ground potential can be connected to the second power terminal of the second transistor or to a node between a pair of series connected batteries of the DC power supply. The inductor can include a pair of inductors connected in series and defining a node therebetween which is connected to the ground potential. Each transistor can include a diode connected between the first power terminal and the second power terminal thereof. Each diode is oriented to conduct current in a direction opposite its corresponding transistor.

I have also invented a DC to DC converter having a first switch and a second switch connected in series between a first input/output of the converter and a second input/output of the converter. The first switch and the second switch define therebetween a first node. A third switch and a fourth switch are connected in series between the first input/output of the converter and the second input/output of the converter. The third switch and the fourth switch define therebetween a second node. An inductor is connected between the first node and the second node. A pair of capacitors is connected in series across the second input/output of the converter. The pair of capacitors defines a third node therebetween which is connected to a ground potential. A controller is connected to control the switching of at least one of the switches.

The ground potential can be connected to an end of the series connected third and fourth switches at the first input/output of the converter. The inductor can include a pair of inductors connected in series and defining a node therebetween which is connected to the ground potential. The first input/output of the converter can be connected to a DC voltage source and the ground reference can be electrically referenced between a positive terminal and a negative terminal of the DC voltage source. The DC voltage source can include a pair of DC voltage sources connected in series and the ground potential can be connected between the pair of DC voltage sources. A diode can be connected in parallel with each switch so that during operation of the converter each switch conducts current in one direction and the diode connected in parallel with each switch conducts current in an opposite direction.

The DC to DC converter can include a DC to DC converter/regulator having an input and an output. The input can be connected to the second input/output of the converter. The converter/regulator includes a first pair of diodes connected in series to conduct current from the output to the input which is connected to the end of the series connected third switch and fourth switch at the second input/output of the converter. The first pair of diodes defines therebetween a fourth node. A second pair of diodes is connected in series to conduct current from the input which is connected to an end of the series connected first switch and second switch at the second input/output of the converter to the output. The second pair of diodes defines therebetween a fifth node. A pair of inductors is connected in series between the fourth node and the fifth node. The pair of inductors defines therebetween a sixth node which is connected to the ground potential. A pair of capacitors is connected in series across the output. The pair of capacitors defines therebetween a seventh node which is connected to the ground potential. A fifth switch is connected in parallel with one of the diodes of the first pair of diodes adjacent the input and a sixth switch is connected in parallel with one of the diodes of the second pair of diodes adjacent the input. During operation of the regulator, the fifth switch conducts current in one direction and the diode connected in parallel with the fifth switch conducts current in an opposite direction and the sixth switch conducts current in one direction and the diode in parallel with the sixth switch conducts current in an opposite direction.

Lastly, I have invented a DC to DC converter having a first pair of diodes connected in series and defining therebetween a first node. The first pair of diodes is connected to conduct current from a first input/output of the converter to a second input/output of the converter. A second pair of diodes is connected in series and defines therebetween a second node. The second pair of diodes is connected to conduct current from the second input/output of the converter to the first input/output of the converter. A pair of inductors is connected in series between the first node and the second node. The pair of inductors defines therebetween a third node which is connected to a reference ground. A pair of capacitors is connected in series across the second input/output of the converter. The pair of capacitors defines therebetween a fourth node which is connected to the reference ground. A first switch is connected in parallel with one diode of the first pair of diodes adjacent the first input/output of the converter. A second switch is connected in parallel with one diode of the second pair of diodes adjacent the first input/output of the converter. A controller controls the switching of the switches so that during operation of the converter, the first and second switches are controlled to conduct current between the first input/output of the converter and the pair of inductors.

The first input/output can be connected to a DC voltage source having a positive terminal and a negative terminal. The reference ground can be electrically referenced between the positive terminal and the negative terminal of the DC voltage source. A third switch can be connected in parallel with the other diode of the first pair of diodes adjacent the second input/output of the converter and a fourth switch can be connected in parallel with the other diode of the second pair of diodes adjacent the second input/output of the converter. During operation of the converter, the third and fourth switches are controlled to conduct between the pair of inductors and the second input/output of the converter. Preferably, the controller controls the switching of the switches so that the first and second switches conduct current simultaneously, the third and fourth switches conduct current simultaneously, and the first and second switches conduct current when the third and fourth switches block current, and vice versa.

DETAILED DESCRIPTION OF THE PREFERRED EMBODIMENTS

Figure 1:
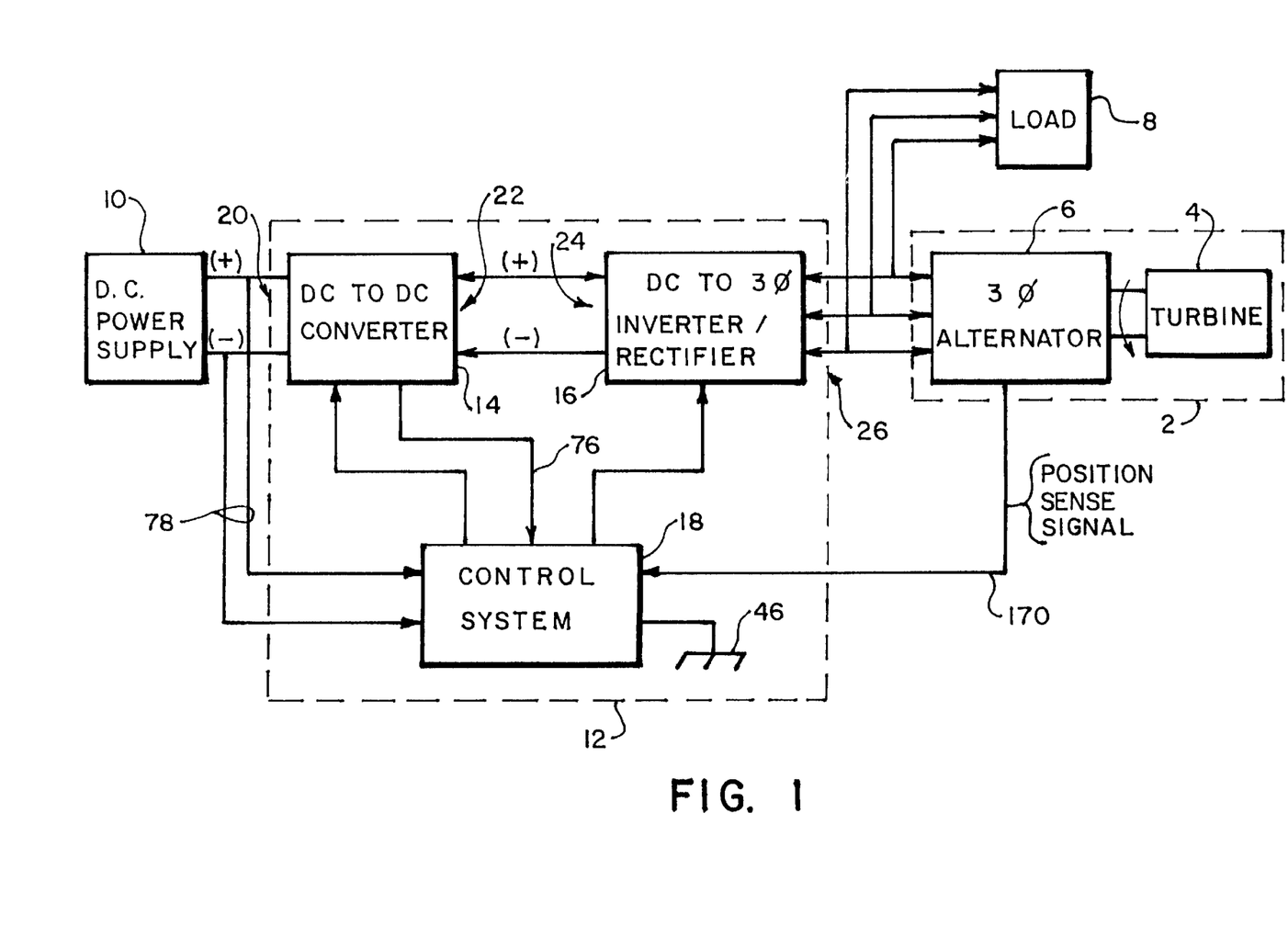
FIG. 1 is a schematic diagram of a power inverter system which includes a DC to DC converter and a DC to three-phase inverter/rectifier for converting DC power to AC power, and vice versa.

With reference to FIG. 1, a typical turbine/generator system 2 includes a turbine 4 which supplies motive force to a three-phase alternator 6 in a manner known in the art. In response to motive force being supplied thereto from the turbine 4, the three-phase alternator 6 generates three-phase electrical power which is supplied to a load 8.

During start-up of the turbine 4, electrical power can be supplied to the three-phase alternator 6 from a DC power supply 10 via an inverter system 12. The power inverter system 12 includes a DC to DC converter 14, a DC to three-phase inverter/rectifier 16 and a control system 18. The DC to DC converter 14 includes a first input/output 20 connected to the DC power supply 10 and a second input/output 22 connected to a first input/output 24 of the DC to three-phase inverter/rectifier 16. The DC to three-phase inverter/rectifier 16 has a second input/output connected to the three-phase alternator 6.

When the three-phase alternator 6 is utilized as a motor during start-up of the turbine 4, the inverter system 12 converts DC voltage received at the first input/output 20 of the DC to DC converter 14 into three-phase AC voltage at the second input/output 26 of the DC to three-phase inverter/rectifier 16. When the turbine is running at a self-sustaining speed, the inverter system 12 terminates supplying three-phase power to the three-phase alternator 6. At an appropriate time, the inverter system 12 converts three-phase AC power received from the three-phase alternator 6 at the second input/output 26 of the DC to three-phase inverter/rectifier 16 into DC power at the first input/output 20 of the DC to DC converter 14. The DC power generated at the first input/output 20 of the DC to DC converter 14 is utilized to charge the DC power supply 10, which includes one or more batteries that are utilized to supply power to the power inverter system 12 when the three-phase alternator 6 is utilized as a motor to provide motive force to the turbine 4 during start-up.

Figure 2:
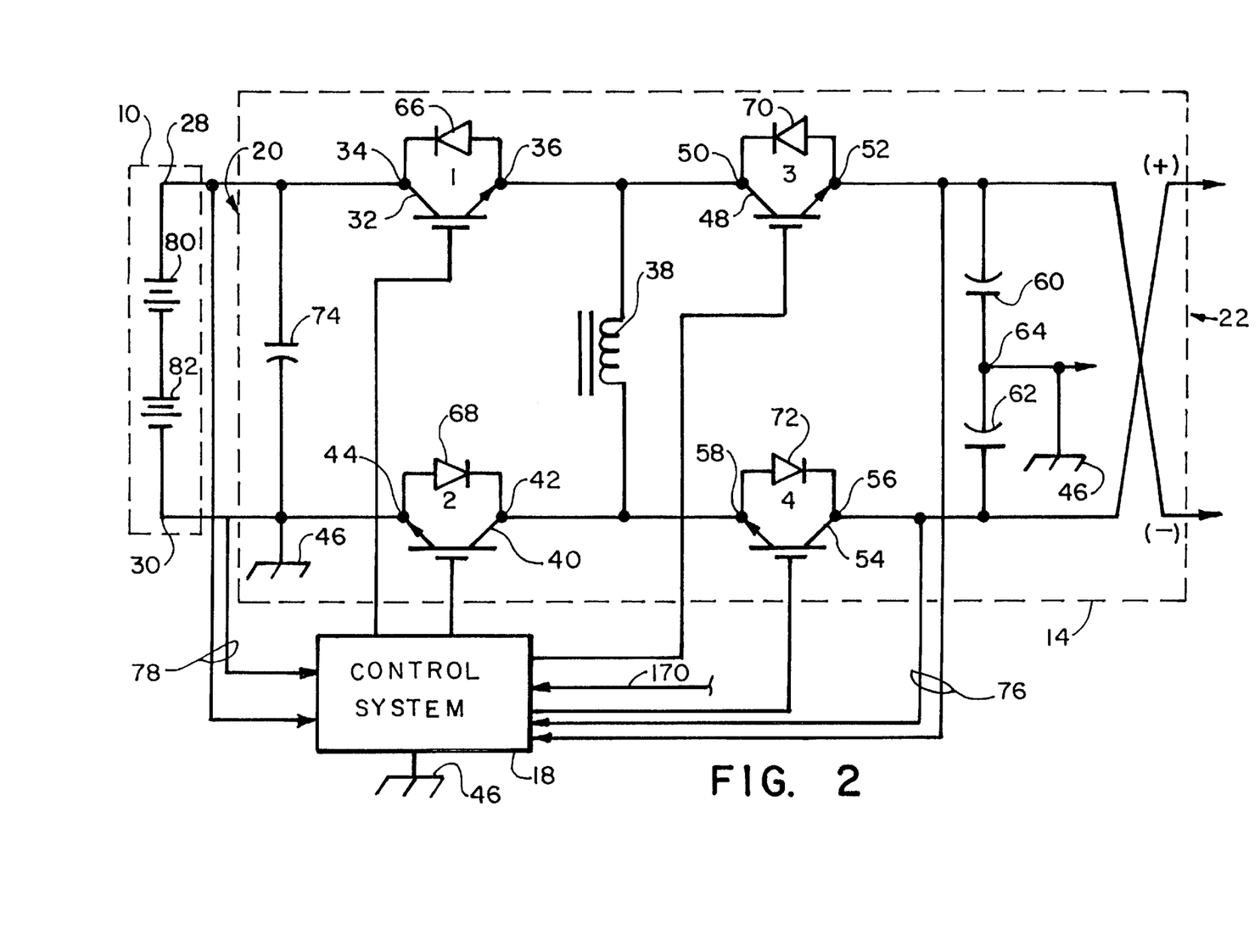
FIG. 2 is an electric circuit diagram of the DC to DC converter of the power inverter system shown in FIG. 1.

With reference to FIG. 2, and with ongoing reference to FIG. 1, the DC power supply 10 has a positive terminal 28 and a negative terminal 30 connected to the first input/output 20 of the DC to DC converter 14. The DC to DC converter 14 has a first transistor 32 having a collector or first power terminal 34 connected to the positive terminal 28 of the DC power supply 10 and an emitter or second power terminal 36 connected to one side of an inductor 38. A second transistor 40 has a collector or first power terminal 42 connected to a side of the inductor 38 opposite the emitter terminal 36 of the first transistor 32 and an emitter or second power terminal 44 which is connected to the negative terminal 30 of the DC power supply 10. Preferably, the negative terminal 30 of the DC power supply 10 and the emitter terminal 44 of the second transistor 40 are connected to a ground potential or reference ground 46.

A third transistor 48 has a collector or first power terminal 50 and an emitter or second power terminal 52. The collector terminal 50 of the third transistor 48 is connected to the emitter terminal 36 of the first transistor 32. A fourth transistor 54 has a collector or first power terminal 56 and an emitter or second power terminal 58. The emitter terminal 58 of the fourth transistor 54 is connected to the collector terminal 42 of the second transistor 40. A pair of capacitors 60 and 62 is connected in series between the emitter terminal 52 of the third transistor 48 and the collector terminal 56 of the fourth transistor 54. The capacitors 60 and 62 define a node 64 therebetween which is connected to the ground potential or reference ground 46. Diodes 66, 68, 70 and 72 are connected between the emitter terminals and the collector terminals of transistors 32, 40, 48 and 54 to conduct current in a direction opposite transistors 32, 40, 48 and 54, respectively. The control system 18 is connected to the base or control terminal of each transistor 32, 40, 48 and 54 to control the switching ON and OFF thereof. The control system is also connected to the ground potential or reference ground 46.

In operation, the control system 18 causes the first and second transistors 32 and 40 to switch ON thereby creating a current path from the DC power supply 10 through the inductor 38. When the current through the inductor 38 increases to a sufficient extent, the control system 18 causes the first and second transistors 32 and 40 to switch OFF. The current flowing through the inductor 38 when the first and second transistors 32 and 40 switch OFF flows through diodes 70 and 72 and capacitors 60 and 62 thereby charging capacitors 60 and 62. When the current through the inductor 38 decreases to a sufficient extent, the control system 18 causes the first and second transistors 32 and 40 to switch ON thereby creating the current path between the DC power supply 10 and the inductor 38. Thereafter, the control system 18 repeats switching the first and second transistors 32 and 40 OFF and ON when the current through the inductor 38 increases and decreases to a sufficient extent, respectively, to maintain a charge, and hence the voltage, in the capacitors 60 and 62 at a desired level when the DC to three-phase inverter/rectifier 16 supplies power to the three-phase alternator 6 operating as a motor during start-up of the turbine 4. When the DC to DC converter 14 supplies power from the DC power supply 10 to the DC to three-phase inverter/rectifier 16, the control system 18 causes the third and fourth transistors 48 and 54 to remain switched OFF.

When the turbine 4 is running at a self-sustaining speed, a rectifier of the DC to three-phase inverter/rectifier 16 converts three-phase AC voltage received at the second input/output 26 thereof into a rectified DC voltage at the first input/output 24 thereof. The control system 18 causes the DC to DC converter 14 to convert the rectified DC voltage received at the second input/output 22 thereof into a regulated DC voltage at the first input/output 20 thereof. The DC voltage generated by the DC to DC converter 14 at the first input/output 20 thereof is utilized to charge batteries or other storage elements of the DC power supply 10.

More specifically, when the DC to DC converter 14 is utilized to charge the DC power supply 10, the control system 18 causes the third and fourth transistors 48 and 54 to switch ON thereby creating a current path between the second input/output 22 and the inductor 38. When the current through the inductor 38 increases to a sufficient extent, the control system 18 causes the third and fourth transistors 48 and 54 to switch OFF. The current flowing through the inductor 38 when the third and fourth transistors 48 and 54 switch OFF flows through diodes 66 and 68 and the DC power supply 10 thereby charging the DC power supply 10.

When the current through the inductor 38 decreases to a sufficient extent, the control system 18 causes the third and fourth transistors 48 and 54 to switch ON thereby creating the current path between the second input/output 22 and the inductor 38. Thereafter, the control system 18 repeats switching the third and fourth transistors 48 and 54 OFF and ON when the current through the inductor 38 increases and decreases to a sufficient extent, respectively, to maintain the voltage at the first input/output 20 at a desired level for charging the DC power supply 10. When the DC to DC converter 14 supplies power from the DC to three-phase inverter/rectifier 16 to the DC power supply 10, the control system causes the first and second transistors 32 and 40 to remain switched OFF.

Connecting the negative terminal 30 of the DC power supply 10, the node 64 and the control system 18 to the ground potential or reference ground 46 maintains the DC power supply 10, the capacitors 60 and 62 and the control system 18 referenced to a known potential thereby avoiding the voltage across the capacitors 60 and 62, the voltage at the negative terminal 30 of the DC power supply 10 and/or the voltage of electrical sub-systems of the control system 18 from floating to undesirable and potentially dangerous levels.

Preferably, the DC to DC converter 14 includes a capacitor 74 connected between the collector terminal 34 of the first transistor 32 and the emitter terminal 44 of the second transistor 40 for filtering AC signals coupled between the DC power supply 10 and the first input/output 20 of the DC to DC converter 14. Voltage sense leads 76 can be connected between the control system 18 and the second input/output 22 of the DC to DC converter 14, and voltage sense leads 78 can be connected between the control system 18 and the first input/output 20 of the DC to DC converter 14. The voltage sense leads 76 and 78 enable the control system 18 to measure the voltage across the capacitors 60 and 62 and the DC power supply 10, respectively. Utilizing the voltages sensed on the voltage sense leads 76 and 78, the control system 18 can control the switching of the first and second transistors 32 and 40 to generate a desired DC voltage at the second input/output 22 of the DC to DC converter 14, and can control the switching of the third and fourth transistors 48 and 54 to generate a desired DC voltage at the first input/output 20 of the DC to DC converter 14. Preferably, the DC power supply 10 includes batteries 80 and 82 connected in series between the positive terminal 28 and the negative terminal 30 thereof.

Figure 3:
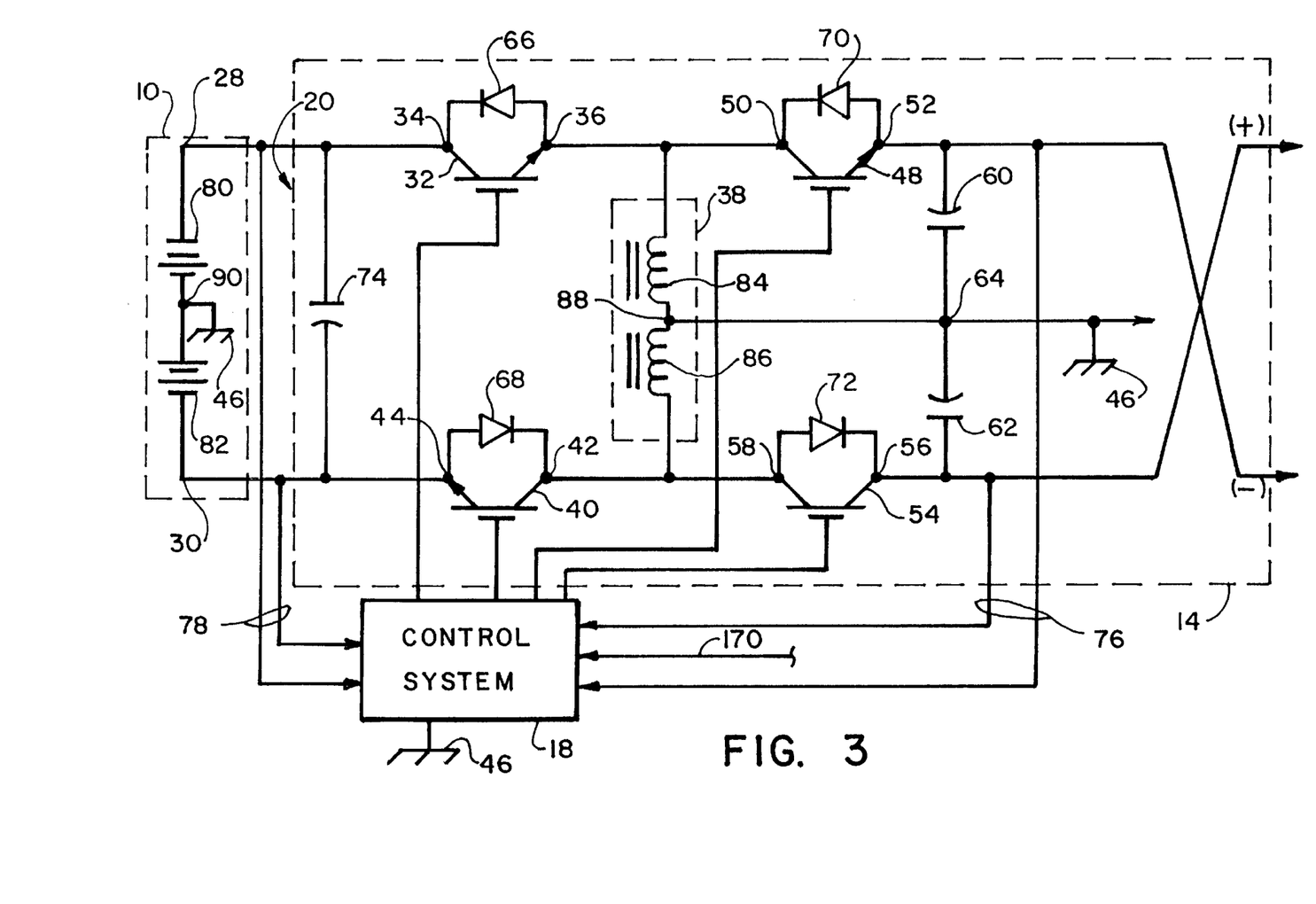
FIG. 3 is a modified electric circuit diagram of the DC to DC converter shown in FIG. 2.

A variation of the DC to DC converter 14 of FIG. 2 is shown in FIG. 3, where like reference numbers correspond to like elements. In the DC to DC converter 14 shown in FIG. 3, the inductor 38 includes a pair of inductors 84 and 86 connected in series and defining a node 88 therebetween. The node 88 is connected to the ground potential or reference ground 46. In the embodiment shown in FIG. 3, the ground potential 46 is also connected to a node 90 between batteries 80 and 82, not to the negative terminal 30 of the DC power supply 10 as shown in FIG. 2. An advantage of referencing the DC to DC convertor 14 shown in FIGS. 2 and 3 to the ground potential or reference ground 46 and referencing the negative terminal 30 or the node 90 of the DC power supply 10 to the ground potential or reference ground 46 is that the three-phase alternator 6 can utilize a shaft position sensor for feedback to the control system 18 for both speed and position sensing, thus avoiding the need for separate shaft positioning and speed systems with a corresponding reduction in cost and complexity. Moreover, since the DC power supply 10 and the second input/output 22 of the DC to DC converter 14 are referenced to the same ground potential or reference ground 46, large potential differences between the DC power supply 10 and the node 64 are avoided. Thus, when electrical sub-systems such as the control system 18, ignition exciters, pressure transducers, speed pickups, temperature measuring devices, and the like, are connected to and derive their operating power and ground potential or reference ground 46 from the DC power supply 10, large potential differences are avoided between these electrical sub-systems and node 64.

Figure 4:
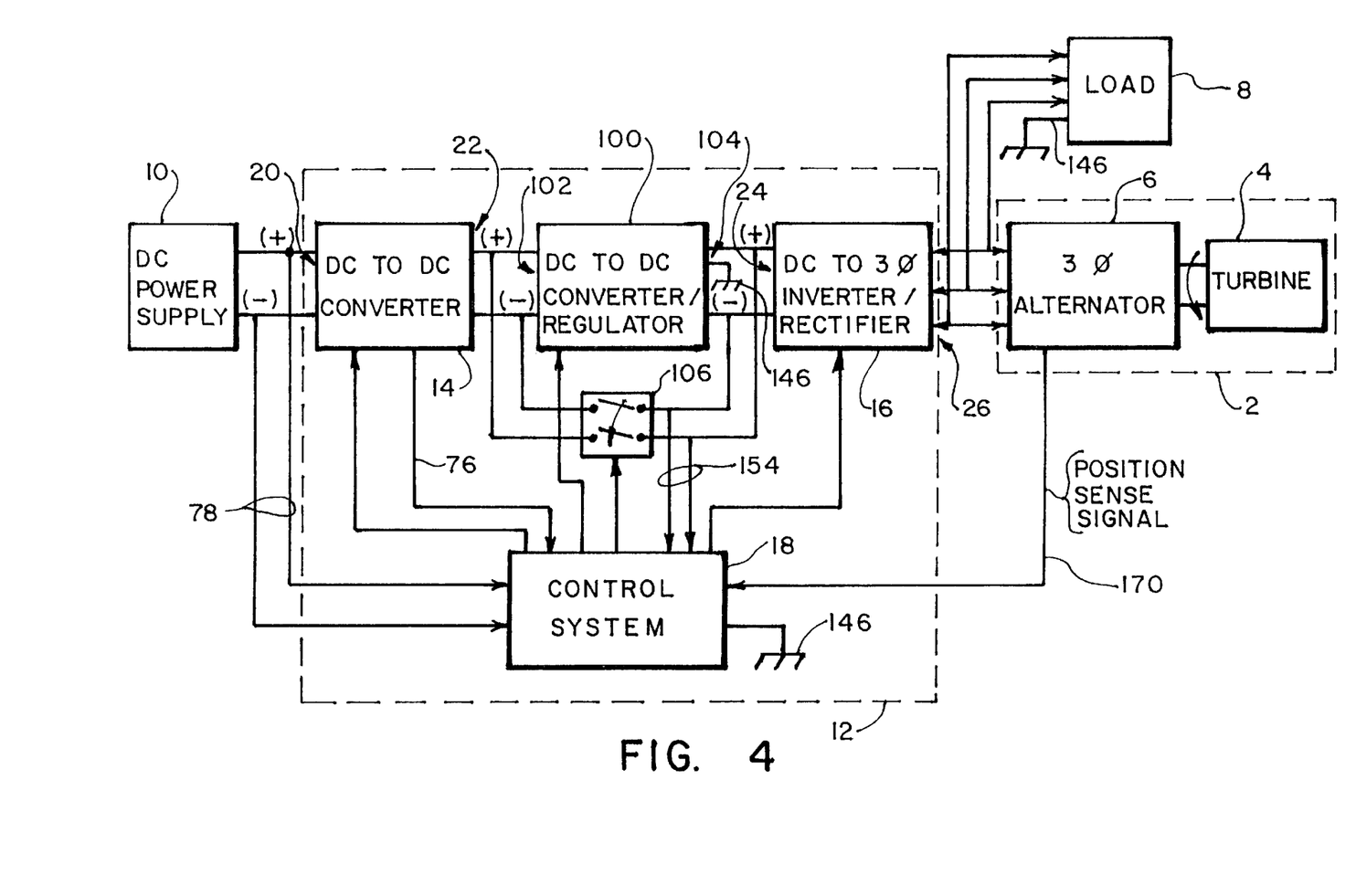
FIG. 4 is a schematic diagram of the power inverter system shown in FIG. 1 including a DC to DC converter/regulator connected between the DC to DC converter and the DC to three-phase inverter/rectifier.

With reference to FIG. 4, a DC to DC converter/regulator 100 can be connected between the second input/output 22 of the DC to DC converter 14 and the first input/output 24 of the DC to three-phase inverter/rectifier 16 to regulate the voltage supplied to the first input/output 24 of the DC to three-phase inverter/rectifier 16. The DC to DC converter/regulator 100 has an input 102 connected to the second input/output 22 of the DC to DC converter 14 and an output 104 connected to the first input/output 24 of the DC to three-phase inverter/rectifier 16. The DC to DC converter/regulator 100 regulates DC power received at the input 102 thereof and provides a regulated voltage at the output 104 thereof. If the DC to DC converter/regulator 100 is configured to supply power unidirectionally from the DC to DC converter 14 to the DC to three-phase inverter/rectifier 16, a switch 106 is connected between the first input/output 24 of the DC to three-phase inverter/rectifier 16 and the second input/output 22 of the DC to DC converter 14. When the rectifier of the DC to three-phase inverter/rectifier 16 supplies power to the DC to DC converter 14, the control system 18 causes the switch 106 to activate and connect the first input/output 24 of the DC to three-phase inverter/rectifier 16 and the second input/output 22 of the DC to DC converter 14, thereby bypassing the DC to DC converter/regulator 100. If, however, the DC to DC converter/regulator 100 can supply power bidirectionally, the switch 106 can be omitted.

Figure 5:
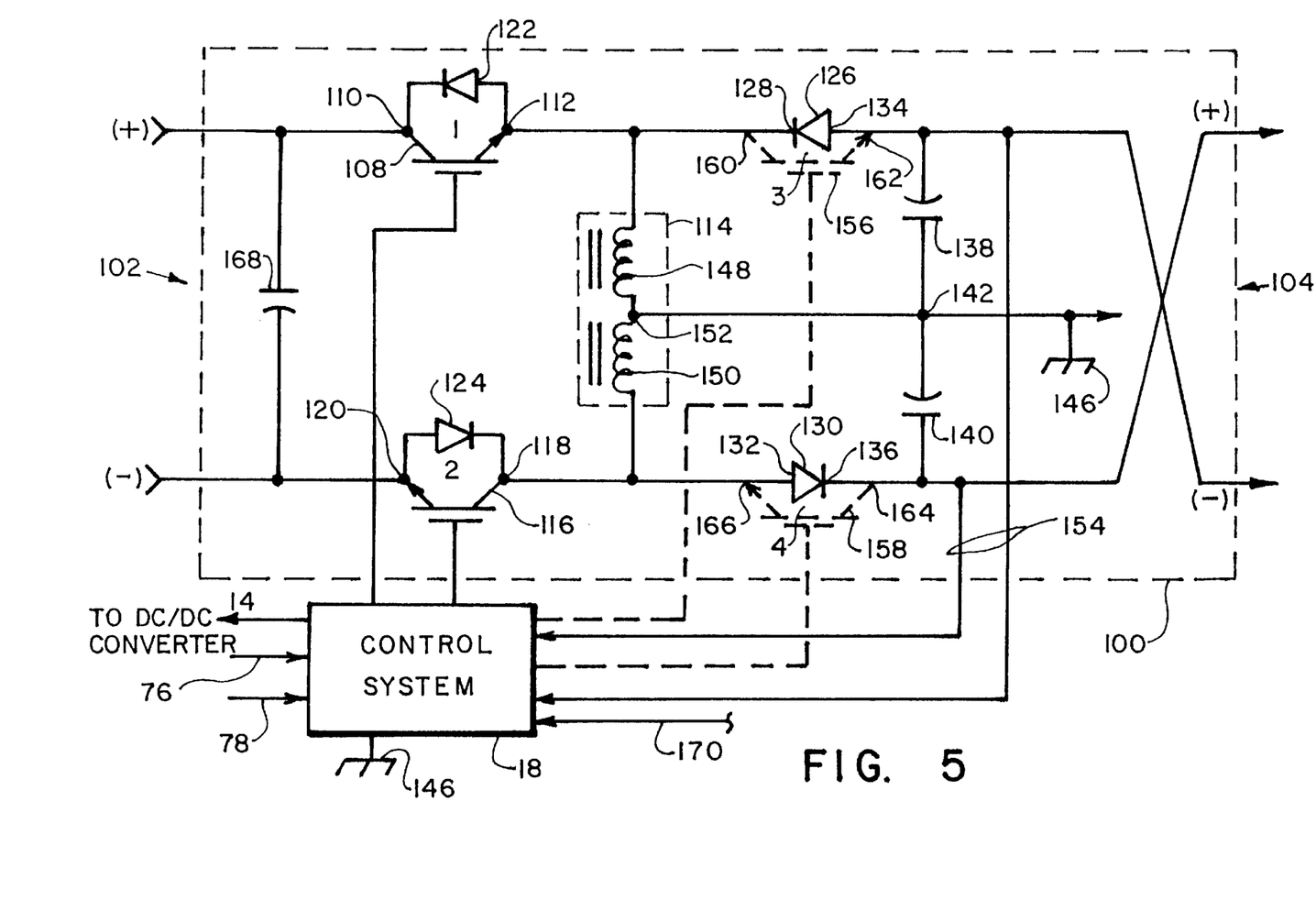
FIG. 5 is an electric circuit diagram of the DC to DC converter/regulator shown in FIG. 4.

With reference to FIG. 5, and with ongoing reference to FIG. 4, an embodiment of the DC to DC converter/regulator 100 which unidirectionally supplies power between the DC to DC converter 14 and the DC to three-phase inverter 16 is shown. The DC to DC converter/regulator 100 includes a first transistor 108 having a collector or first power terminal 110 connected to a positive terminal of the second input/output 22 of the DC to DC converter 14. The first transistor 108 has an emitter or second power terminal 112 which is connected to one side of an inductor 114. A second transistor 116 has a collector or first power terminal 118 connected to a side of the inductor 114 opposite the first transistor 108 and an emitter or second power terminal 120 connected to a negative terminal of the second input/output 22 of the DC to DC converter 14. The control system 18 is connected to the base or control terminals of the first and second transistors 108 and 116 to control the switching ON and OFF thereof. Diodes 122 and 124 are connected between the collector terminals and the emitter terminals of transistors 108 and 116 to conduct current in a direction opposite their corresponding transistors 108 and 116.

A diode 126 has a cathode terminal 128 connected to the emitter terminal 112 of the first transistor 108. A diode 130 has an anode terminal 132 connected to the collector terminal 118 of the second transistor 116. Connected between an anode terminal 134 of the diode 126 and the cathode terminal 136 of the diode 130 are a pair of capacitors 138 and 140 connected in series. The capacitors 138 and 140 define therebetween a node 142 which is connected to a ground potential or reference ground 146. Preferably, the ground potential or reference ground 146 is connected to the ground potential or reference ground 46 shown in FIGS. 2 and 3. The inductor 114 preferably includes a pair of inductors 148 and 150 connected in series and defining therebetween a node 152 which is connected to the ground potential or reference ground 146. The inductor 114, however, can be a single inductor having a center tap at node 152.

In operation, the control system 18 causes the first and second transistors 108 and 116 to switch ON thereby creating a current path between the input 102 of the DC to DC converter/regulator 100 and the inductor 114. When the current in the inductor 114 increases to a sufficient extent, the control system 18 causes the first nd second transistors 108 and 116 to switch OFF. The current flowing in the inductor 114 when the first and second transistors 108 and 116 switch OFF flows through diodes 126 and 130 and capacitors 138 and 140 thereby charging capacitors 138 and 140. When the current flowing in inductor 114 decreases to a sufficient extent, the control system 18 causes the first and second transistors 108 and 116 to switch ON thereby creating the current path between the input 102 of the DC to DC converter/regulator 100 and the inductor 114. Thereafter, by selectively controlling the switching OFF and ON of the first and second transistors 108 and 116, the control system 18 can charge the capacitors 138 and 140 to a desired extent as measured by voltage sense leads 154 connected between the control system 18 and the output 104 of the DC to DC converter/regulator 100.

Connecting the nodes 142 and 152 to the ground potential or reference ground 146 balances the current flowing through the inductor 114, balances the charging voltage of capacitors 138 and 140, avoids generating undesirable potential differences between the DC power supply 10 and the electronic components of the DC to DC converter/regulator 100 and creates a low impedance path for a neutral current supplied via the ground potential or reference ground 146 connected to load 8, shown in FIG. 4.

Preferably, the DC to DC converter/regulator 100 includes a capacitor 168 across the input 102 thereof for filtering high frequency and/or ripple components generated at the second input/output 22 of the DC to DC converter 14.

The DC to DC converter/regulator 100 can be configured to bidirectionally regulate power between the DC to DC converter 14 and the DC to three-phase inverter 16 by including in parallel with diodes 126 and 130, a third transistor 156 and a fourth transistor 158, respectively, shown in phantom in FIG. 5. The third and fourth transistors 156 and 158 in parallel with diodes 126 and 130 transforms the input 102 into a first input/output of the DC to DC converter/regulator 100 and transforms the output 104 into a second input/output of the DC to DC converter/regulator 100. The third transistor 156 has a collector or first power terminal 160 connected to the cathode terminal 128 of diode 126 and an emitter or second power terminal 162 connected to the anode terminal 134 of the diode 126. The fourth transistor 158 has a collector or first power terminal 164 connected to the cathode terminal 136 of the diode 130 and an emitter or second power terminal 166 connected to the anode terminal 132 of the diode 130. The base or control terminals of the third and fourth transistors 156 and 158 are connected to the control system 18. It should be noted that the DC to DC converter/regulator 100 including the third and fourth transistors 156 and 158 has the same electrical circuit topology as the DC to DC converter 14 shown in FIG. 3. Hence, the DC to DC converter/regulator 100 shown in FIG. 5 can be operated in the same manner described above for the DC to DC converter shown in FIGS. 2 and 3.

The control system 18 controls the operation of the DC to DC converter 14, the DC to three-phase inverter/rectifier 16 and, if provided, the DC to DC converter/regulator 100 as a function of a position sense signal generated by a shaft position sensor (not shown) of the three-phase alternator 6 and supplied to the control system 18 via a sense line 170, shown best in FIGS. 1 and 4. More specifically, during start-up of the turbine 4 utilizing the three-phase alternator 6 as a motor, the control system 18 coordinates the operation of the DC to DC converter 14, the DC to DC converter/regulator 100 and the DC to three-phase inverter/rectifier 16 as a function of the position sense signal on sense line 170 and the voltages sensed by voltage sense leads 76, 78 and 154 to selectively increase the frequency and/or voltage of the three-phase power generated by the DC to three-phase inverter/rectifier 16 and supplied to the three-phase alternator 6.

When the turbine is running at a self-sustaining speed, the control system 18 terminates the DC to DC converter 14, the DC to DC converter/regulator 100 and the DC to three-phase inverter/rectifier 16 supplying power to the three-phase alternator 6 and initiates supplying power from the three-phase alternator 6 to the DC power supply 10. More specifically, the control system 18 utilizes the position sense signal on sense line 170 and the voltages sensed by voltage sense leads 76, 78 and 154 to coordinate the operation of the DC to DC converter 14 and the DC to DC converter/regulator 100 to convert the rectified DC voltage produced at the first input/output 24 of the DC to three-phase inverter/rectifier 16 into a DC voltage at the first input/output 20 of the DC to DC converter 14 to charge the DC power supply 10 to a desired voltage. Alternatively, the control system 18 coordinates the operation of the switch 106 and the DC to DC converter 14 to charge the DC power supply 10 to a desired voltage.

The invention has been described with reference to the preferred embodiments. Obvious modifications and alterations will occur to others upon reading and understanding the preceding detailed description. For example, an inverter and an alternator having more or less than three phases can be utilized. It is intended that the invention be construed as including all such modifications and alterations insofar as they come with the scope of the appended claims or the equivalents thereof.

I claim:

1. A DC to DC converter, comprising:
   an inductor;
   a first transistor having a first power terminal connectable to one side of a DC power supply and a second power terminal connected to one end of the inductor;
   a second transistor having a first power terminal connected to the other end of the inductor and a second power terminal connectable to another side of the DC power supply;
   a pair of capacitors connected in series and defining a node therebetween which is connected to a ground potential;
   a third transistor having a first power terminal connected to the one end of the inductor and a second power terminal connected to one end of the pair of capacitors;
   a fourth transistor having a first power terminal connected to the other end of the pair of capacitors and a second power terminal connected to the other end of the inductor; and
   a controller connected to a control terminal of each transistor for controlling the switching thereof.

2. The DC to DC converter as set forth in claim 1, wherein the second power terminal of the second transistor is connected to the ground potential.

3. The DC to DC converter as set forth in claim 1, wherein the inductor comprises a pair of inductors connected in series and defining a node therebetween which is connected to the ground potential.

4. The DC to DC converter as set forth in claim 3, wherein:
   the DC power supply includes a pair of DC power supplies connected in series; and
   the ground potential is connected between the pair of DC power supplies.

5. The DC to DC converter as set forth in claim 1, wherein:
   the first power terminal of each transistor is a collector terminal;
   the second power terminal of each transistor is an emitter terminal; and
   the control terminal of each transistor is a base terminal.

6. The DC to DC converter as set forth in claim 1, wherein each transistor includes a diode connected between the first power terminal and the second power terminal thereof, with each diode oriented to conduct current in a direction opposite its corresponding transistor.

7. The DC to DC converter as set forth in claim 1, further including another capacitor connected between the first power terminal of the first transistor and the second power terminal of the second transistor.

8. The DC to DC converter as set forth in claim 6, wherein:
   the controller causes the first and second transistors to switch ON thereby creating a current path from the DC power supply to the inductor;
   when the current through the inductor increases to a sufficient extent, the control system causes the first and second transistors to switch OFF thereby causing the current in the inductor to flow through the diodes in parallel with the third and fourth transistors and the pair of capacitors;
   when the current through the inductor decreases to a sufficient extent, the control system causes the first and second transistors to switch ON thereby creating a current path from the DC power supply to the inductor; and
   the controller continues switching the first and second transistors OFF and ON when the current through the inductor increases and decreases to a sufficient extent, respectively, to maintain a charge in the pair of capacitors at a desired level.

9. The DC to DC converter as set forth in claim 6, wherein:
   the controller causes the third and fourth transistors to switch ON thereby creating a current path from the pair of capacitors to the inductor;
   when the current through the inductor increases to a sufficient extent, the control system causes the third and fourth transistors to switch OFF thereby causing the current in the inductor to flow through the diodes in parallel with the first and second transistors and the DC power supply;
   when the current through the inductor decreases to a sufficient extent, the control system causes the third and fourth transistors to switch ON thereby creating a current path from the pair of capacitors to the inductor; and
   the controller continues switching the third and fourth transistors OFF and ON when the current through the inductor increases and decreases to a sufficient extent, respectively, to charge the DC power supply to a desired level.

10. A DC to DC converter, comprising:

a first switch and a second switch connected in series between a first input/output of the converter and a second input/output of the converter, with the first switch and the second switch defining therebetween a first node;

a third switch and a fourth switch connected in series between the first input/output of the converter and the second input/output of the converter, with the third switch and the fourth switch defining therebetween a second node;

an inductor connected between the first node and the second node;

a pair of capacitors connected in series across the second input/output of the converter and defining therebetween a third node which is connected to a ground potential; and a controller connected to control the switching of at least one of the switches.

11. The DC to DC converter as set forth in claim 10, wherein the ground potential is connected to an end of the series connected third switch and fourth switch at the first input/output of the converter.

12. The DC to DC converter as set forth in claim 10, wherein the inductor comprises a pair of inductors connected in series and defining therebetween a node which is connected to the ground potential.

13. The DC to DC converter as set forth in claim 12, wherein:

the first input/output of the converter is connectable to a DC voltage source; and the ground reference is electrically referenced between a positive terminal and a negative terminal of the DC voltage source.

14. The DC to DC converter as set forth in claim 13, wherein:

the DC voltage source includes a pair of DC voltage sources connected in series; and the ground potential is connected between the pair of DC voltage sources.

15. The DC to DC converter as set forth in claim 10, further including another capacitor connected across the first input/output of the converter.

16. The DC to DC converter as set forth in claim 10, further including a diode connected in parallel with each switch wherein, during operation of the converter, each switch conducts current in one direction and the diode connected in parallel with each switch conducts current in an opposite direction.

17. The DC to DC converter as set forth in claim 16, wherein:

the controller causes the switches adjacent the first input/output of the converter to switch ON thereby creating a current path from the DC power supply to the inductor;

when the current through the inductor increases to a sufficient extent, the control system causes the switches adjacent the first input/output of the converter to switch OFF thereby causing the current in the inductor to flow through the diodes in parallel with the switches adjacent the second input/output of the converter and the pair of capacitors;

when the current through the inductor decreases to a sufficient extent, the control system causes the switches adjacent the first input/output of the converter to switch ON thereby creating a current path from the DC power supply to the inductor; and the controller continues switching the switches adjacent the first input/output of the converter OFF and ON when the current through the inductor increases and decreases to a sufficient extent, respectively, to maintain a charge in the pair of capacitors at a desired level.

18. The DC to DC converter as set forth in claim 16, wherein:

the controller causes the switches adjacent the second input/output of the converter to switch ON thereby creating a current path from the pair of capacitors to the inductor;

when the current through the inductor increases to a sufficient extent, the control system causes the switches adjacent the second input/output of the converter to switch OFF thereby causing the current in the inductor to flow through the diodes in parallel with the switches adjacent the first input/output of the converter and the DC power supply;

when the current through the inductor decreases to a sufficient extent, the control system causes the switches adjacent the second input/output of the converter to switch ON thereby creating a current path from the pair of capacitors to the inductor; and the controller continues switching the switches adjacent the second input/output of the converter OFF and ON when the current through the inductor increases and decreases to a sufficient extent, respectively, to charge the DC power supply to a desired level.

19. The DC to DC converter as set forth in claim 16, further including a DC to DC converter/regulator having an input and an output, with the input connected to the second input/output of the converter, the converter/regulator comprising:

a first pair of diodes connected in series between the input and the output and defining therebetween a fourth node, with the first pair of diodes connected to conduct current from the output to the input which is connected to an end of the series connected third switch and fourth switch at the second input/output of the converter;

a second pair of diodes connected in series between the input and the output and defining therebetween a fifth node, with the second pair of diodes connected to conduct current from the input which is connected to an end of the series connected first switch and second switch at the second input/output of the converter to the output;

a pair of inductors connected in series between the fourth node and the fifth node, with the pair of inductors defining therebetween a sixth node which is connected to the ground potential;

a pair of capacitors connected in series across the output, with the pair of capacitors defining therebetween a seventh node which is connected to the ground potential;

a fifth switch connected in parallel with one of the diodes of the first pair of diodes adjacent the input; and a sixth switch connected in parallel with one of the diodes of the second pair of diodes adjacent the input wherein, during operation of the converter/regulator, the fifth switch conducts current in one direction and the diode connected in parallel with the fifth switch conducts current in an opposite direction and the sixth switch conducts current in one direction and the diode connected in parallel with the sixth switch conducts current in an opposite direction.

20. A DC to DC converter, comprising:

a first pair of diodes connected in series and defining therebetween a first node, with the first pair of diodes connected to conduct current from a first input/output of the converter to a second input/output of the converter;

a second pair of diodes connected in series and defining therebetween a second node, with the second pair of diodes connected to conduct current from the second input/output of the converter to the first input/output of the converter;

a pair of inductors connected in series between the first node and the second node, with the pair of inductors defining therebetween a third node which is connected to a reference ground;

a pair of capacitors connected in series across the second input/output of the converter, with the pair of capacitors defining therebetween a fourth node which is connected to the reference ground;

a first switch connected in parallel with one diode of the first pair of diodes adjacent the first input/output of the converter;

a second switch connected in parallel with one diode of the second pair of diodes adjacent the first input/output of the converter; and a controller connected to control the switching of the first and second switches, wherein during operation of the converter, the first and second switches are controlled to conduct current between the first input/output of the converter and the pair of inductors.

21. The DC to DC converter as set forth in claim 20, wherein:

the first input/output is connectable to a DC voltage source having a positive terminal and a negative terminal; and the reference ground is electrically connected between the positive terminal and the negative terminal of the DC voltage source.

22. The DC to DC converter as set forth in claim 20, further including another capacitor connected across the first input/output of the converter.

23. The DC to DC converter as set forth in claim 20, further including:

a third switch connected in parallel with the other diode of the first pair of diodes adjacent the second input/output of the converter; and a fourth switch connected in parallel with the other diode of the second pair of diodes adjacent the second input/output of the converter, wherein:

the controller is connected to control the switching of the third and fourth switches; and during operation of the converter, the third and fourth switches are controlled to conduct current between the pair of inductors and the second input/output of the converter.

24. The DC to DC converter as set forth in claim 23, wherein:

the controller controls the switching of the switches so that the first and second switches conduct current simultaneously;

the third and fourth switches conduct current simultaneously; and the first and second switches conduct current when the third and fourth switches block current, and vice versa.

25. The DC to DC converter as set forth in claim 20, wherein:

the controller causes the first and second switches to switch ON thereby creating a current path from the DC power supply to the pair of inductors;

when the current through the pair of inductors increases to a sufficient extent, the control system causes the first and second switches to switch OFF thereby causing the current in the pair of inductors to flow through the diodes adjacent the second input/output of the converter and the pair of capacitors;

when the current through the pair of inductors decreases to a sufficient extent, the control system causes the first and second switches to switch ON thereby creating a current path from the DC power supply to the pair of inductors; and the controller continues switching the first and second switches OFF and ON when the current through the pair of inductors increases and decreases to a sufficient extent, respectively, to maintain a charge in the pair of capacitors at a desired level.

26. The DC to DC converter as set forth in claim 23, wherein:

the controller causes the third and fourth switches to switch ON thereby creating a current path from the pair of capacitors to the pair of inductors;

when the current through the pair of inductors increases to a sufficient extent, the control system causes the third and fourth switches to switch OFF thereby causing the current in the pair of inductors to flow through the diodes in parallel with the first and second switches and the DC power supply;

when the current through the pair of inductors decreases to a sufficient extent, the control system causes the third and fourth switches to switch ON thereby creating a current path from the pair of capacitors to the pair of inductors; and the controller continues switching the third and fourth switches OFF and ON when the current through the pair of inductors increases and decreases to a sufficient extent, respectively, to charge the DC power supply to a desired level.

* * * * *